US00RE34651E

United States Patent [19]

Hoopman et al.

[11] E Patent Number: Re. 34,651

[45] Reissued Date of Patent: Jun. 28, 1994

[54] SHEET-MEMBER CONTAINING A PLURALITY OF ELONGATED ENCLOSED ELECTRODEPOSITED CHANNELS AND METHOD

[75] Inventors: Timothy L. Hoopman, River Falls, Wis.; Harlan L. Krinke, May Township, Washington County, Minn.

[73] Assignee: Minnesota Mining and Manufacturing Company, St. Paul, Minn.

[21] Appl. No.: 542,706

[22] Filed: May 29, 1990

Related U.S. Patent Documents

Reissue of:

[64] Patent No.: 4,871,623
Issued: Oct. 3, 1989
Appl. No.: 157,914
Filed: Feb. 19, 1988

[51] Int. Cl.[5] ..... F28F 3/12; C25D 1/02

[52] U.S. Cl. ..... 428/586; 428/613; 428/935; 428/936; 65/168; 205/67; 205/73; 205/75

[58] Field of Search ..... 428/586, 596, 600, 593, 428/934, 613, 935, 936, 595; 204/3, 9, 11; 165/905, 133, 86, 180, 168; 205/67, 73, 75

[56] References Cited

U.S. PATENT DOCUMENTS

| | | | |
|---|---|---|---|
| 2,365,670 | 12/1944 | Wallace | 204/9 |
| 2,890,273 | 8/1959 | La Fonge et al. | 204/9 |
| 3,332,858 | 7/1967 | Bittinger | 204/11 |
| 3,445,348 | 5/1969 | Aske | 204/11 |
| 3,520,357 | 7/1970 | Bruner | 204/11 |
| 3,654,009 | 4/1972 | Judd et al. | 156/155 |
| 3,686,081 | 8/1972 | Butter et al. | 204/16 |
| 3,692,637 | 9/1972 | Dederra et al. | 204/9 |
| 3,709,797 | 1/1973 | Stobo | 204/16 |
| 3,752,751 | 8/1973 | Hirose | 204/181 |
| 3,763,001 | 10/1973 | Withers | 204/16 |
| 3,829,963 | 8/1974 | McDougall et al. | 29/599 |
| 3,847,211 | 11/1974 | Fichel et al. | 165/166 |
| 3,850,762 | 11/1974 | Smith | 204/11 |
| 3,896,010 | 7/1975 | Vetter | 205/28 |
| 3,901,731 | 8/1975 | Warszawski et al. | 136/86 R |
| 3,989,602 | 11/1976 | McCandless et al. | 204/9 |
| 4,022,585 | 5/1977 | Kaye | 428/551 |
| 4,049,024 | 9/1977 | Aubors et al. | 140/71.5 |
| 4,078,604 | 3/1978 | Christl et al. | 165/133 |
| 4,141,802 | 2/1979 | Duparque et al. | 204/15 |
| 4,147,201 | 4/1979 | Rabinovitch et al. | 164/35 |
| 4,182,412 | 1/1980 | Shum | 165/905 |
| 4,250,943 | 2/1981 | Rabinovitch et al. | 164/35 |
| 4,285,779 | 8/1981 | Shiga et al. | 204/9 |
| 4,341,823 | 7/1982 | Sexton et al. | 427/404 |
| 4,390,588 | 6/1983 | Ebneth et al. | 428/263 |
| 4,401,519 | 8/1983 | Kadija et al. | 204/11 |

(List continued on next page.)

FOREIGN PATENT DOCUMENTS

| | | | |
|---|---|---|---|
| 0124428 | 7/1984 | European Pat. Off. | H01L 23/56 |
| 2016735 | 7/1910 | Fed. Rep. of Germany | 8 K/4 |
| 45-16886 | 6/1970 | Japan . | |
| 47-6078 | 2/1972 | Japan . | |
| 48-366 | 1/1973 | Japan . | |
| 46-50330 | 3/1973 | Japan . | |
| 50-31197 | 3/1975 | Japan . | |
| 51-11053 | 1/1976 | Japan . | |
| 14259 | 2/1977 | Japan | 165/133 |
| 26996 | 2/1983 | Japan | 165/133 |
| 62-7872 | 1/1987 | Japan | C23C 18/16 |
| 651700 | 9/1985 | Switzerland | H01B 7/00 |
| 1137127 | 12/1968 | United Kingdom | C23F 17/00 |
| 1199404 | 7/1970 | United Kingdom | C23B 7/00 |

OTHER PUBLICATIONS

Article entitled "Optimal Structure for Microgrooved Cooling Fin for High-Power LSI Devices;" dated Oct. 21, 1986.

(List continued on next page.)

*Primary Examiner*—John Zimmerman
*Attorney, Agent, or Firm*—Gary L. Griswold; Walter N. Kirk; Leland D. Schultz

[57] ABSTRACT

A sheet member and a method for constructing the sheet member. The sheet member includes a plurality of elongated, enclosed channels formed by electrodeposition.

14 Claims, 4 Drawing Sheets

U.S. PATENT DOCUMENTS

| | | | |
|---|---|---|---|
| 4,432,838 | 2/1984 | Kadija | 204/11 |
| 4,435,252 | 3/1984 | Kadija | 204/11 |
| 4,439,768 | 3/1984 | Eneth et al. | 343/18 B |
| 4,476,206 | 10/1984 | Viala et al. | 429/234 |
| 4,516,632 | 5/1985 | Swift et al. | 165/167 |
| 4,522,889 | 7/1985 | Ebneth et al. | 428/614 |
| 4,567,505 | 1/1986 | Pease et al. | 357/81 |
| 4,568,603 | 2/1986 | Oldham | 428/195 |
| 4,569,391 | 2/1986 | Hulswitt et al. | 165/166 |
| 4,622,621 | 11/1986 | Barre | 361/382 |
| 4,624,751 | 11/1986 | Morin et al. | 204/28 |
| 4,643,918 | 2/1987 | Orban | 427/304 |
| 4,645,573 | 2/1987 | Orban | 204/14.1 |
| 4,645,574 | 2/1987 | Orban | 204/14.1 |
| 4,669,820 | 6/1987 | Ten Berge | 350/96.20 |
| 4,680,093 | 7/1987 | Morin | 204/28 |
| 4,712,158 | 12/1987 | Kikuchi | 361/385 |

OTHER PUBLICATIONS

Article entitled "Demonstration of High-Performance Silocon Microchannel Heat Exchanges for Laser Diode Array Cooling;" *American Institute of Physics;* Appl. Phys. Lett. 53 (12), Sep. 19, 1988, pp. 1030-1032.

Article entitled "Thermal Management of Surface Mount Power Devices;" Reprinted from Aug., 1987 issue of *Powerconversion Intelligent Motion for Power Electronics & Intelligent Motion Systems Engineers,* by Herb Fick Bergquist.

Article entitled "Microfabrication of Membranes with Extreme Porosity and Uniform Pore Size;" 1988 Elsevier Science Publishers B.V., *Journal of Membrane Science,* 36 (1988), pp. 67-77.

Brochure entitled "Introducing the ACX* Compact Heat Exchanger-;" (an ultra-compact, adaptable, high--performance cooling unit from *Astro*), 4 sheets. no date.

Brochure entitled "The Astro ACX Compact Heat Exchanger;" *Astro,* Summer 1986 by John E. Leily.

Brochure entitled "Diode Laser Guide;" *Melles Griot,* 1987.

Brochure entitled "Flexible Shaft Couplings;" *Servometer,* pp. 1-8. no date.

Brochure entitled "Miniature Metal Bellows and Electrofocus;" *Servometer.* no date.

Brochure entitled "Micro Drilled Inserts;" *Bird Precision,* 4 sheets. no date.

A technical data sheet entitled "Zone Annealed Strip;" *Technical Materials, Inc.,* Jun. 1984 Bulletin, 4 sheets.

Article entitled "Fabricating Closed Channel by Elecroforming", by H. R. Johnson and J. W. Dini; *Plating and Surface Finishing;* pp. 456-461; May 1975.

Wilson, Edward A. "Integral Liquid-Cooling System Simplifies Design of Densely Packaged Computer", *Electronics,* Jan. 26, 1984.

Keyes, Robert W. "Heat Transfer in Forced Convection Through Fins", *IEEE Transactions on Electron Devices,* vol. ED-31, No. 9, Sep. 1984, pp. 1218-1221.

Hollworth, B. R., Gero, L. R. "Entrainment Effects on Impingement Heat Transfer: Part II—Local Heat Transfer Measurements", *Journal of Heat Transfer,* Nov. 1985, vol. 107, pp. 910-915.

Watari, Toshihiko et al "Packaging Technology For the NEC SW Supercomputer," 35th Electronics Components Conference, *Proceedings 1985,* pp. 192-198.

Shafer, Donald A. "Basic Electroforming", Hallmark Cards Inc., date unknown; includes a photograph of a recess enclosure as the result of high current density bridging during electroplating.

Tuckerman, D. B. and Pease, R. F. W. "High-Performance Heat Sinking for VLSI", *IEEE Electron Device Letters,* vol. EDL-2, No. 5, May 1981.

Rodia, Carl M. "Electroforming", date unknown.

Simons, R. E. and Chu, R. C. "Direct Immersion Cooling Techniques For High Density Elecronic Packages and Systems", *IBM Corporation,* pp. 314-321, no date.

Nakatogawa, Tetsundo, et al, "Heat Transfer of Round Turbulent Jet Impinging Normally on Flat Plate", University of Tokyo, Tokyo, Japan, no date.

Goldberg, Norman "Narrow Channel Forced Air Heat Sink", *IEEE Transactions on Components, Hybrids, and Manufacturing Technology,* vol. CHMT-7, No. 1, Mar. 1984, pp. 154-159.

Lyman, Jerry "Special Report Supercomputers Demand Innovation in Packaging and Cooling", *Electronics,* Sep. 22, 1982, pp. 136-143.

Pittier, M. S., Powers, D. M., Schnabel, D. L. "System Development and Technology Aspects of the IBM 3081 Processor Complex", *IBM Journal of Research Development,* vol. 26, No. 1, Jan. 1982, pp. 2-11.

*Encyclopedia of Chemical Technology,* Third Edition, vol. 8, John Wiley & Sons, 1979, pp. 738-750 and 826-868.

SHEET-MEMBER CONTAINING A PLURALITY OF ELONGATED ENCLOSED ELECTRODEPOSITED CHANNELS AND METHOD

Matter enclosed in heavy brackets [ ] appears in the original patent but forms no part of this reissue specification; matter printed in italics indicates the additions made by reissue.

*This application is a Reissue of U.S. Pat. No. 4,871,623, filed Feb. 19, 1988.*

TECHNICAL FIELD

This invention relates to a sheet member having a plurality of elongated enclosed channels and a method for generating the sheet member.

BACKGROUND ART

Various approaches have been developed in the past for providing an article having elongated enclosed channels. Such channels are useful, such as for the circulation of fluids. Articles have been assembled having a plurality of discrete tubes bonded together, or to a common support structure. Additionally, holes may be machined into a solid block of material to form passageway. However, such constructions have been expensive to manufacture and have been difficult to construct with extremely small, and/or closely spared elongated passageways.

Electrodeposition of materials on patterns known as mandrels to construct articles having a desired shape has been known in the past. It is also recognized that electrodeposition on to a mandrel containing recesses or grooves may result in the formation of enclosed voids. That is, due to localized variations in the potential gradient during the electrodeposition process, the deposited material will form at a faster rate adjacent corners, projections or other sharp changes in the geometry of the mandrel. If allowed to accumulate at the tops of recesses of a mandrel, the material on each side of the recess will meet or "bridge" at an intermediate point over the recess, shielding the interior of the recess from the accumulation of further material. An enclosed void is thus formed, generally recognized prior to the present invention as a defect in the article produced.

DISCLOSURE OF THE INVENTION

This invention provides sheet member having a plurality of enclosed elongated channels that includes opposing major surfaces. A plurality of elongated, enclosed electroformed channels extend through the sheet member between the opposing major surfaces. The channels have a predetermined cross sectional shape.

The method disclosed for constructing the sheet member comprises the steps of providing a mandrel having a base portion and a plurality of elongated ridge portions projecting from the base portion. The ridge portions have conductive surfaces and elongated edges spaced above the base portion. The ridge portions also define elongated grooves between the ridge portions. A conductive material is electrodeposited on the conductive surfaces, with the conductive material being deposited on the edges of the ridge portions at a faster rate than on the surfaces defining inner surfaces of the grooves until the conductive material bridges across between the ridge portions to envelope central portions of the grooves and form the sheet member. The sheet member includes a base layer and a plurality of elongated projections, each extending from the sheet member base layer into the grooves, with each of the projections containing an elongated enclosed channel.

In one embodiment, the method also includes the further step of separating the mandrel from the sheet member.

In yet another embodiment, wherein the sheet member projections have elongated edges spaced above the base layer and the projections define elongated grooves between the projections, the method also includes the further steps of electrodepositing a conductive material on the conductive surfaces of the projections with the conductive material being deposited on the edges of the projections at a faster rate than on the surfaces defining inner surfaces of the grooves until the conductive material bridges across between the projections to envelope central portions of the grooves and form additional elongated enclosed channels in the sheet member.

Thus, a sheet member is provided that includes a plurality of elongated enclosed channels extending therethrough that is quickly and inexpensively produced, and is particularly adapted to produce channels of extremely small cross sectional area and having a predetermined shape. As previously discussed, it has been known that an electrodeposition process may result in the formation of enclosed spaces within an electroformed piece. However, it is unexpected until the present invention that such enclosed spaces may be deliberately produced in the form of elongated enclosed channels having a predetermined shape.

BRIEF DESCRIPTION OF DRAWING

The present invention will be further described with reference to the accompanying drawing wherein like reference numerals refer to like parts in the several views, and wherein.

DETAILED DESCRIPTION

Figure 1:
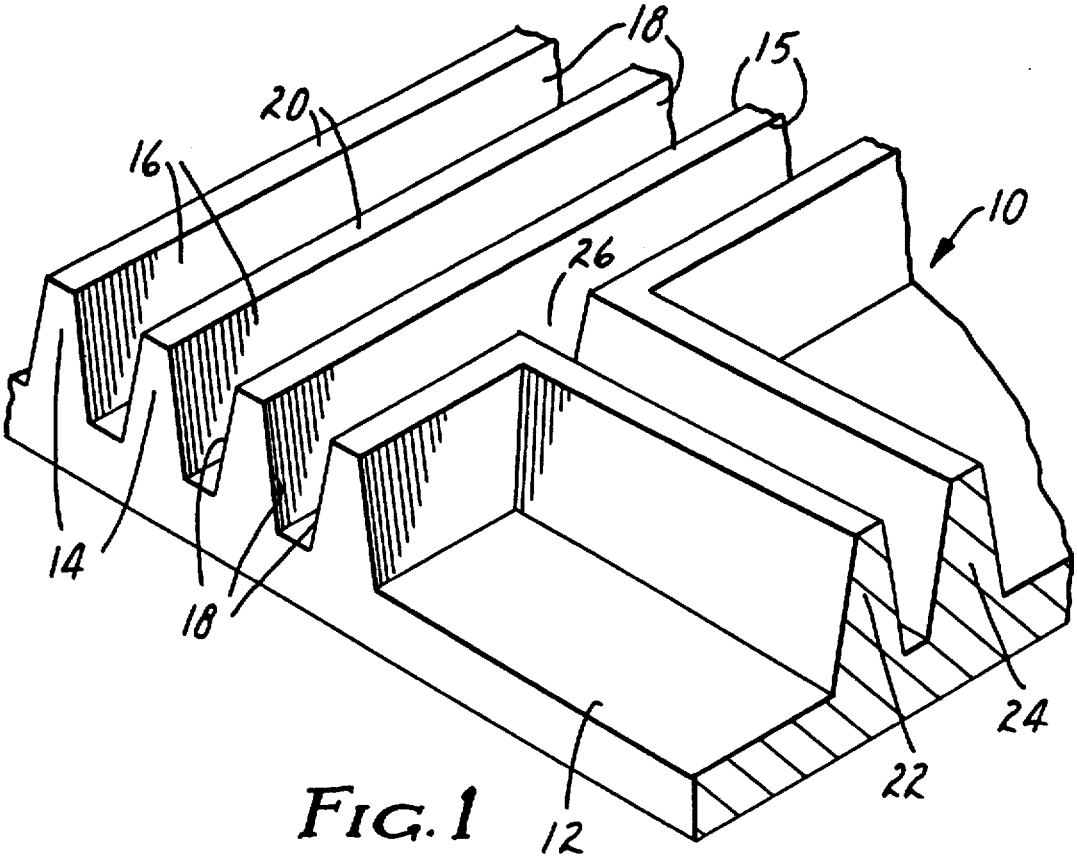
FIG. 1 is an isometric view of a mandrel for use in constructing the sheet member according to the present invention having a plurality of elongated ridge portions.
Figure 2:
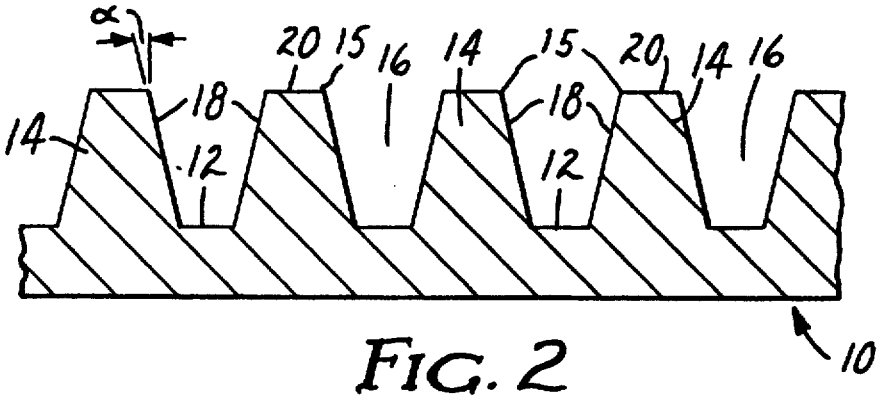
FIG. 2 is a cross sectional view of a portion of the mandrel of FIG. 1 along plane 2—2.

Referring now to FIGS. 1 and 2, there is shown mandrel 10 for use in the method according to this invention in producing the sheet member. The mandrel includes a base portion 12 and a plurality of elongated ridge portions 14. The ridge portions 14 include edges 15 spaced from the base portion and each adjacent pair of ridge portions define an elongated groove 16 therebetween. The ridge portions 16 have tapered surfaces 16 inclined at an angle $\alpha$ with respet to the base portion 12. The top of each ridge portion includes a surface 20 generally parallel with the base portion 12. The mandrel is constructed of a conductive material such as Nickel or Brass, or alternatively, by a non-conductive material having a conductive outer coating or layer. For instance, a plastic or flexible material such as silicone rubber may be provided with a conductive coating on at least the ridge portions 14 of use as a mandrel in this invention. In the illustrated embodiment of the invention, the ridge portions are substantially identical in size and shape and further are parallel and uniformly positioned with respect to each other on the base portion 12 of the mandrel. However, as shown in FIG. 1, one pair of ridge portions 22 and 24 are oriented transversely to the remaining ridge portions, and intersect a ridge portion 14 at point 26, as will be explained in greater detail hereinafter.

A sheet member according to the present invention may be generated using the mandrel through an electrodeposition process. For the purposes of this invention, the term "electrodeposition" includes both "electrolytic" and "electroless" plating, which differ primarily in the source of the electrons used for reduction. In the preferred electrolytic embodiments, the electrons are supplied by an external source, such as a direct current power supply, whereas in the electroless plating process the electrons are internally provided by a chemical reducing agent in the plating solution.

Preferably, at least the surface of the ridge portions 14 of the mandrel are passivated, such as by contacting the surface with a 2% solution of Potassium Dichromate in distilled water at room temperature. The mandrel is then rinsed with distilled water. Passivation of the surface of the ridge portions of the mandrel is desirable in that it provides a thin oxide coating which facilitates remoal of an electroformed article from the mandrel. Passivation of the surface of the ridge portions of the mandrel may not be necessary in the case where the mandrel is provided with a conductive coating as previously discussed, where the conductive layer is transferred from the mandrel to the electroformed article as hereinafter produced to facilitate removal of the completed article from the mandrel. Further, passivation is not necessary where it is desired to permanently bond the sheet member produced, as described herein, to the mandrel.

The mandrel is then immersed in a plating bath for a desired period of time for the electrodeposition of a material on the surface of the mandrel. Any appropriate eletrodepositable material may be used, such as nickel, copper, or alloys thereof.

In one embodiment of this invention, the plating bath consists of a solution of Nickel Sulfamate (16 oz. of Ni/gal.); Nickel Bromide (0.5 oz./gal.); Boric Acid (4.0 oz./gal.) in distilled water with a specific gravity of 1.375–1.40. Anodes are provided in the form of S-Nickel pellets. The pellets are immersed in the plating bath and carried in Titanium baskets enclosed in polypropylene fabric anode basket bags.

Preferably the mandrel is rotated about an axis perpendicular to the axis of the rotation of the mandrel at 5–10 rpm in periodically reversed rotational directions within the plating bath to ensure even plating on the mandrel. The temperature of the plating bath is maintained at 120° and a pH of 3.8–4.0 Normally during operations, the pH of the plating bath rises. Therefore, the pH is periodically adjusted by the addition of sulfamic acid. Evaporation loses are compensated for by the addition of distilled water to maintain the desired specific gravity. The plating bath is continuously filtered, such as through a 5 micron filter. The filtered output of the pump is preferably directed at the mandrel to provide fresh nickel ions.

Figure 3:
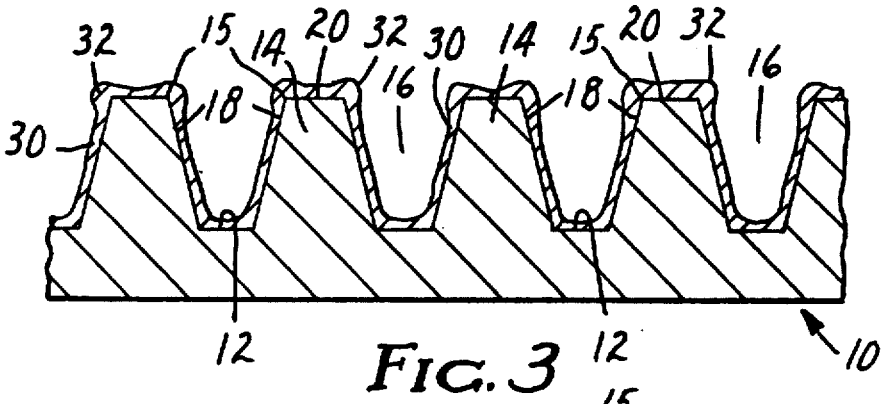
FIG. 3 is a cross sectional view of the mandrel of FIG. 2, with conductive material partially electrodeposited thereon.
Figure 4:
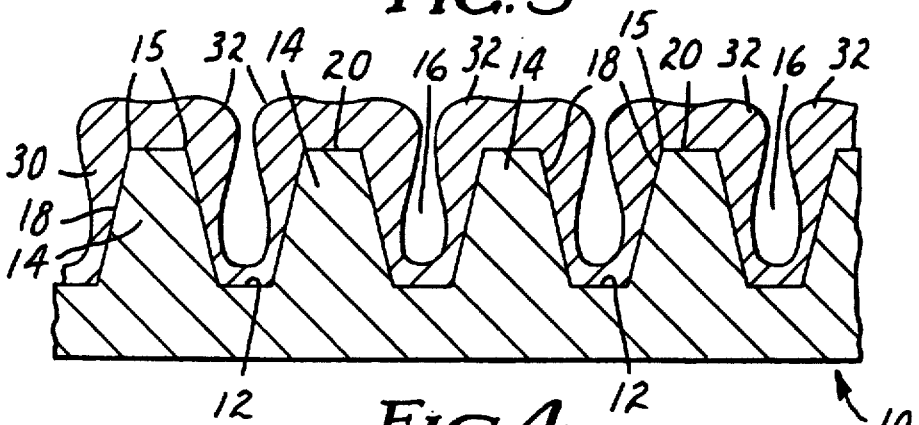
FIG. 4 is cross sectional view of the mandrel of FIG. 3 with additional conductive material electrodeposited on the mandrel.
Figure 5:
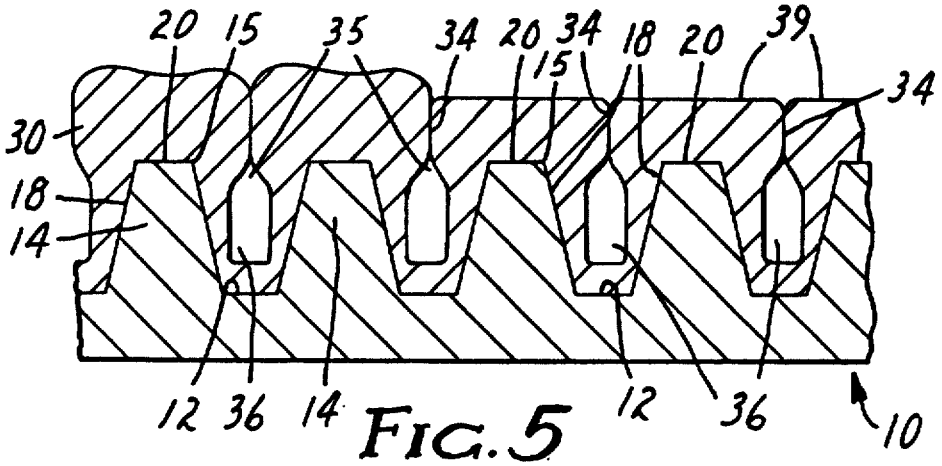
FIG. 5 is a cross sectional view of the mandrel of FIG. 4, with additional conductive material electrodeposited on the mandrel so as to envelope the grooves of the mandrel.

The deposition of the nickel on the mandrel is a function of the D.C. current applied, with 0.001 inch/hour of nickel deposited on a flat surface at average current density rate of 20 amperes per square foot (ASF). However, as previously discussed, the electrodeposited material 30 has a tendency to accumulate at a faster rate in electrolytic deposition adjacent sharp changes in the geometry of the mandrel, such as the edges 15 of the ridge portions 14 as shown sequentially in FIGS. 3–5. A larger potential gradient and resulting electric field is present at the edges which induces deposition of material at a faster rate (as at 32) than on flat surfaces in the inner portions of the grooves. Eventually, the material deposited on either edge of the ridge portions of the mandrel "bridge" between the adjacent ridges so as to envelope the central portion of the grooves within the electrodeposited material. The void space enveloped by the material is now shielded from the electrical field and no further deposition occurs. The junction 34 of the material is referred to as a "knit" line. The body thus formed is integral and structurally unitary. The space that is enveloped by the material defines elongated, enclosed channels 36 extending through the sheet member formed on the mandrel. The channels each have a size, shape and cross sectional area determined by the configuration of the mandrel, the material used to construct the article, and the rate of deposition, among other factors. The higher the average current density during deposition, the faster the grooves are enveloped, and the larger the average cross sectional area of the channels. Of course, the average current rate must be sufficient so that a completely solid sheet member is not produced. In electroless embodiments, faster deposition rates have also been observed near sharp changes in geometry. It is belived that this results from the effects of increased surface area of depletion-induced nonuniformities in the plating solution.

In the illustrated embodiment, the ridge portions on the mandrel have oppositely tapered sides 18 and the channels 36 produced have a generally rectangular cross sectional shape. A relatively small crevice 35 extends slightly above the channel as a remnant of the formation of the knit line.

Referring now again to FIG. 1, the mandrel 12 includes two projections 22 and 24 intersecting a transverse projection 14 at a point 26. It will be appreciated that this configuration produces a sheet member having intersecting channels 36 at point 26.

Figure 6:
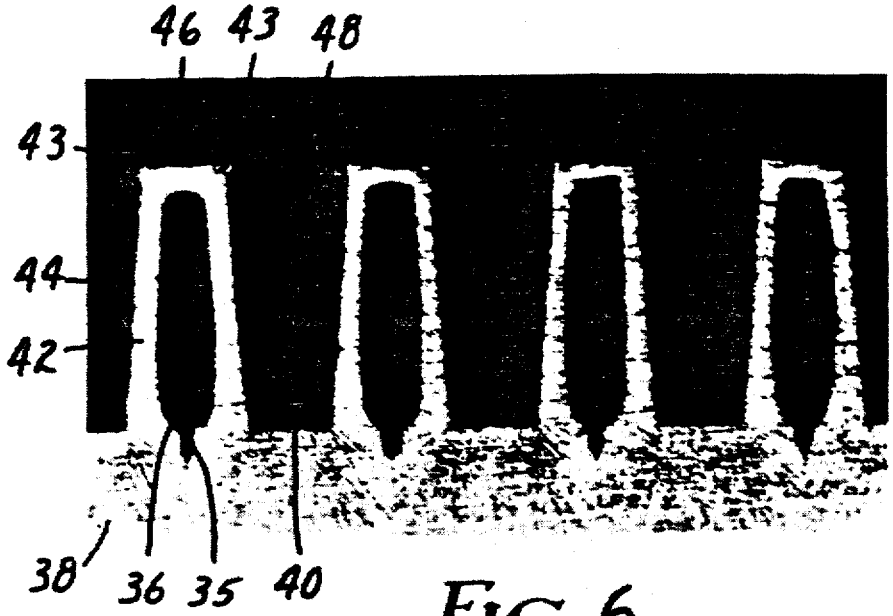
FIG. 6 is a photomicrograph of a cross section of a sheet member according to this invention for circulating fluids.

Deposition of the material on the mandrel continues after the formation of the channels until a base layer 40 having desired thickness above the channels is achieved. After sufficient deposition of material and the enclosing of the channels, the mandrel is removed from the plating bath. In one embodiment of the invention, the sheet member 38 is separated from the mandrel as shown in FIG 6. Otherwise, the sheet member may be left bonded to the mandrel after formation of the channels. It may also be desired that the base layer 40 of the sheet member is ground or otherwise modified to form planar surface 39 as in FIG. 5. The sheet member 38 includes a plurality of projections 42 with tapered sides 44 and a top 46 extending from base layer 40. Each of the projections is a replication of the grooves 14 of the mandrel and includes one of the channels 36. Further, the projection 42 of the sheet member 38 include edges 43 spaced from the base portion 40 and each adjacent pair of projections define a plurality of grooves 48 therebetween.

If desired, the projection 42 of the sheet member may be constructed so as to function as described in co-pending U.S. [patent application Ser. No. 904,358 filed Sep. 1986 and now abandoned] *Pat. No. 4,875,259* entitled "Intermeshable Fasteners", which is incorporated herein by reference. In this embodiment, projections 42 each include at least one side inclined relative to the base layer 40 at an angle sufficient to form a taper such that said projection may mesh with at least one corresponding projection when brought into contact with said corresponding projection and adhere thereto at least partially because of the frictional characteristics of the contacting sides. Further, the projection 42 of the sheet member 38 may be utilized to radiate or convey heat from fluids circulated through the channels, as hereinafter described.

Figure 7:
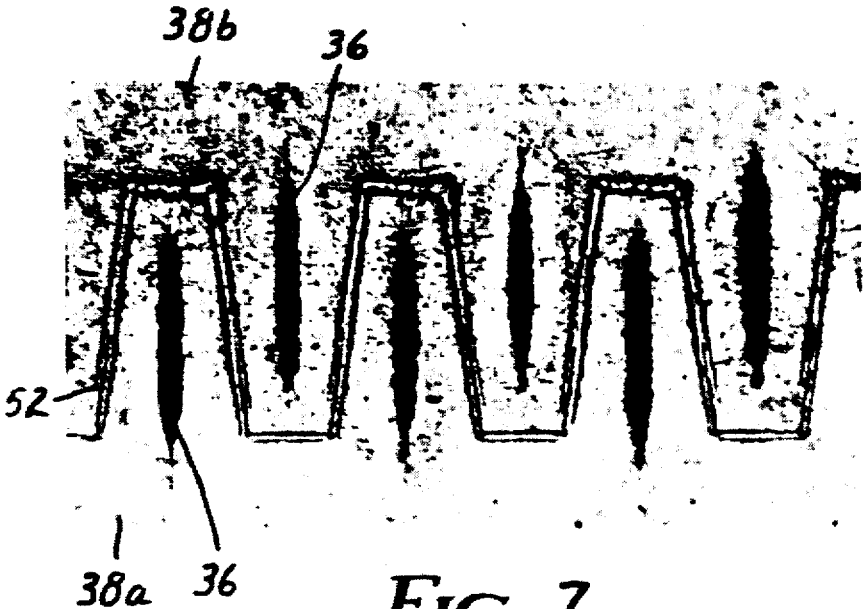
FIG. 7 is a photomicrograph of a cross section of a sheet member electroformed at a rate of 40 amperes per square foot and grooves spaced 0.0107" apart and 0.0129" deep.
Figure 8:
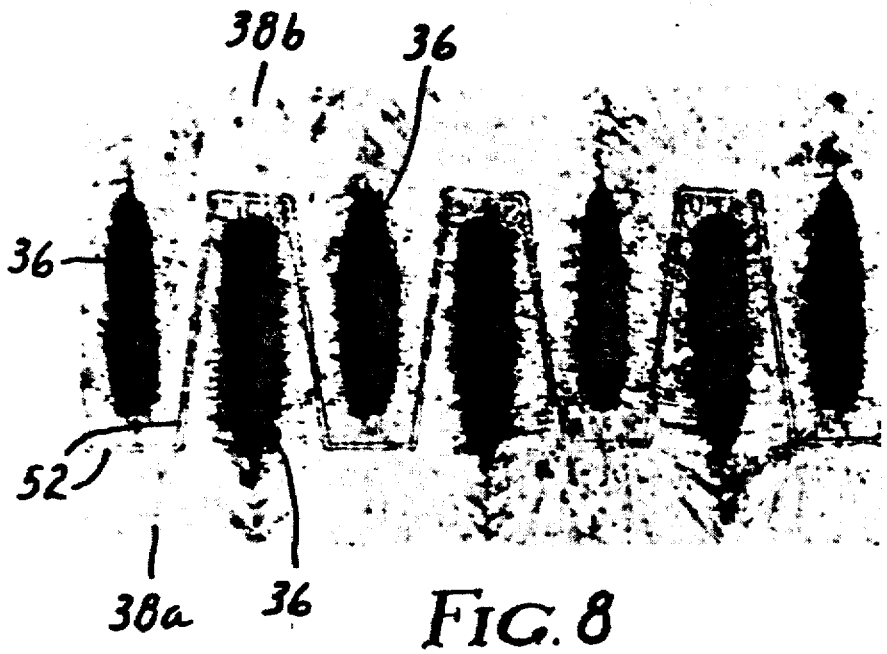
FIG. 8 is a photomicrograph of a cross section of a sheet member as in FIG. 7 for circulating fluids electroformed at a rate of 80 amperes per square foot.
Figure 9:
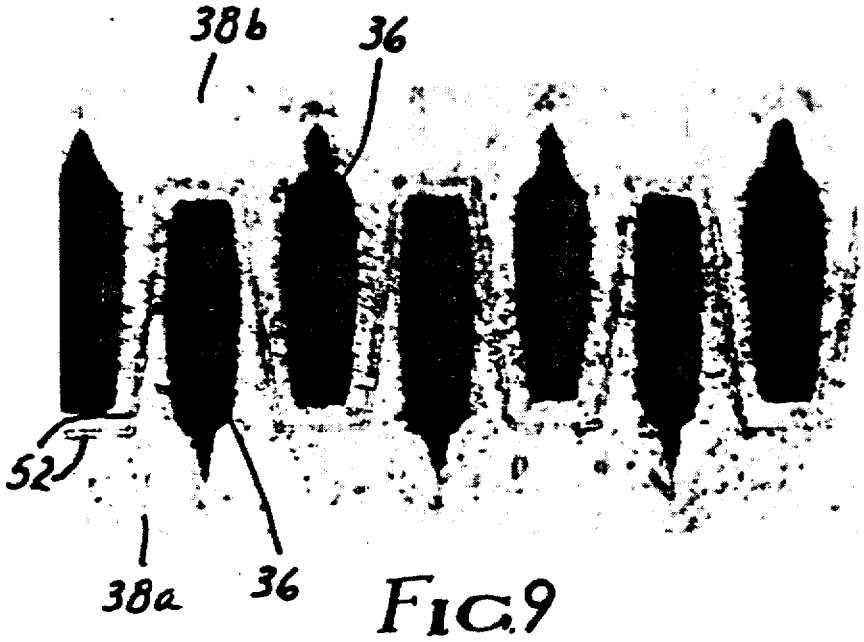
FIG. 9 is a photomicrograph of a cross section of a sheet members as in FIG. 7 for circulating fluids electroformed at a rate of 160 amperes per square foot.

However, in many applications, it is desirable to construct additional channels on the sheet member 38. In such a case, the sheet member is utilized as a first sheet portion 38*a* constituting a mandrel for generating a complementary second sheet portion 38*b* integrally joined to the first sheet portion, as shown in FIGS. 7-9. The method of this invention this may include further steps to accomplish this. The exterior surfaces of the first sheet portion is preferably activated, such as by rinsing with a solution of sulfamic acid. Activation of the surface of the first sheet portion 38*a* is desirable to facilitate bonding of additional material thereon by removing oxide or other contaminates from the surface of the first sheet portion 38*a*. The first sheet portion 38*a* is then immersed in a plating bath as hereinabove described. A second sheet portion 38*b* substantially identical to the first sheet portion 38*a* is then produced with as plurality of elongated enclosed channels formed in the projections of the base layer of the second sheet portion such that the projections of the first and second sheet portions are interdigitated and joined at boundary 52. Since the material of the second sheet portion 38*b* is elecrodeposited directly on the first sheet portion 38*a*, the first and second sheet portions form a unitary sheet member with a plurality of elongated enclosed channels. If desired, however, the second sheet portion may be formed as a solid member, without channels, such as to mechanically strengthen the sheet member.

It is to be understood that the rate of deposition of the material may be controlled to alter the size and shape of the channels. For instance, FIG. 7 illustrates the formation of a sheet member with an average current density of 40 amperes per square foot (ASF) applied. The average cross sectional area of the enclosed channels thus produced has been measured at $1.8\times10^{-5}$ sq. inches ($1.2\times10^{-4}$ sq cm). FIG. 8 illustrates a sheet member formed with the application of an average current density of 80 AF, with an average measured channel cross sectional area of $4.0\times10^{-5}$ sq. inches ($2.5\times10^{-4}$ sq. cm). FIG. 9 illustrates a sheet member formed with the application of a average current density of 160 ASF, with an average measured channel cross sectional area of $5.2\times10^{-5}$ sq. inches ($3.4\times10^{4}$ sq. cm).

Figure 10:
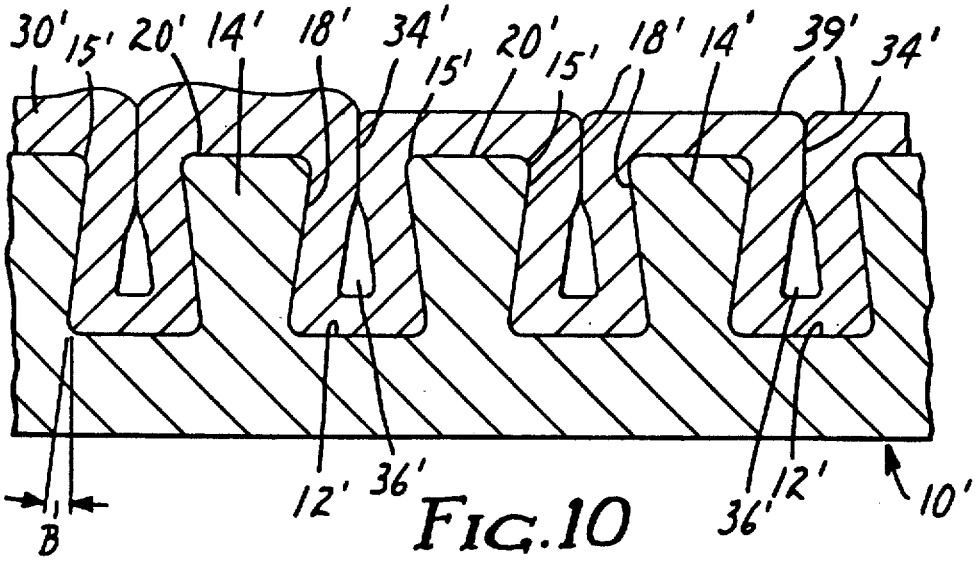
FIG. 10 is a cross sectional view of an alternative embodiment of the mandrel of FIG. 1 including ridge portions having sides inclined at a negative angle with respect to a base portion of the mandrel.

FIG. 10 illustrates an alternate embodiment of the invention in which the mandrel 12' includes projections 41 having conductive surfaces 18, inclined at a negative angle $\beta$ and edges 15'. The undercut projections require that the mandrel be constructed of a flexible material, such as silicone rubber to facilitate removal, of of a material that may be destroyed during removal without damaging the sheet member. The mandrel shown in FIG. 10 produces a channel 36' having a generally triangular shape. As in FIG. 5, the exposed surface 39' of the sheet member may be ground, or otherwise modified as found convenient.

Of course, it is within the scope of this invention to produce sheet members having channels with any desired cross sectional shape, as predetermined by the shape of the ridge portions on the mandrel used to produce the sheet member as well as the rate of deposition of the material. For instance, the sides of the ridge portions of the mandrel may be perpendicular to the base portion. It is also one of the features and advantages of this invention that sheet members having elongated enclosed electroformed channels having a cross sectional area of any desired size. A sheet member of any desired thickness may be generated. Further, sheet members may be constructed that are flexible so as to be able to closely conform to the configurations of a supportive structure (not shown).

The sheet member of this invention is particularly advantageous if utilized for the circulation of fluids through the plurality of channels. For the purpose of this invention, the term "circulation" includes the transportation, mixing or regulating of fluids. For instance, fluid circulation may be used for heat transfer purposes, to or from an object or area adjacent to or in contact with the sheet member.

Table 1 below illustrates the results of a series of tests performed on a sheet member constructed according to this present invention used for the circulation of fluid for heat transfer purposes. The sheet member was 1 inch$\times$1 inch (2.54 cm$\times$2.54 cm) in dimension and 0.033 inches (0.084 cm) in thickness. The sheet member had 162 channels, each having a cross sectional area of between $5.2\times10^{-5}$ sq inches ($3.4\times10^{-4}$ cm) and $6.9\times10^{-5}$ sq inches ($4.5\times10^{4}$ sq. cm).

A silicon wafer 0.4" (1.0 cm)$\times$0.6" (1.5 cm) and 0.020" (0.5 cm) thick was soldered to one side of the sheet member by an Indium solder layer 0.005 inches (0.012 cm) in thickness. The silcon wafer was centered alone one transverse edge of the silicone water.

In the tests, power was applied to the silicon wafer as shown in the right hand column in Table 1 below. Fluorinert~43 (a fluorochemical marketed by Minnesota Mining & Manufacturing Co. of St. Paul, Minn.) was circulated through the channels of the sheet member for conducting heat away from the silicon wafer. The effectiveness of the heat transfer as the applied power is increased is shown in the column entitled "$\Delta$T Chip to Fluid/°Celsius."

TABLE 1

| Test No. | Fluid Temp. °Celsius | Flow Rate gr./sec. cm width | Press. Drop N/cm² cm length | ΔT Chip to Fluid °Celsius | Power Density W/cm² |
|---|---|---|---|---|---|
| 1 | 22 | 0 | 0 | 65 | 4 |
| 2 | 25 | 1.4 | 2.8 | 4 | 7 |
| 3 | 25 | 1.5 | 2.8 | 18 | 25 |
| 4 | 25 | 1.6 | 2.8 | 24 | 36 |
| 5 | 26 | 1.8 | 2.8 | 42 | 64 |
| 6 | 29 | 1.8 | 2.8 | 46 | 81 |
| 7 | 32 | 2.0 | 2.8 | 56 | 100 |
| 8 | 32 | 2.1 | 2.8 | 65 | 121 |
| 9 | 35 | 2.2 | 2.8 | 78 | 142 |
| 10 | 34 | 4.2 | 6.0 | 64 | 144 |

Although not shown, the sheet member 38 of the present invention may be constructed with channels that are non-parallel or non-linear. The depth, angle of inclination, and spacing of the channels may be varied, as desired, and the cross sectional area can vary throughout the length of the channel. For instance, if the circulation of fluids through the channels is for heat transfer purposes, the channels may be concentrated at one or more points within the sheet member to more effectively convey the fluid for heat transfer. Different materials and different deposition rates may be used to construct the first and second sheet portions, if desired.

The present invention has now been described with reference to multiple embodiments thereof. It will be apparent to those skilled in the art that many changes can be made in the embodiments described without departing from the scope of the present invention. Thus, the scope of the present invention should not be limited to the structures described in this application, but only by structures described by the language of the claims and the equivalents of those structures.

We claim:

1. An article for circulating fluids, comprising:

(a) a sheet member having opposing major surfaces; and (b) a plurality of elongated, enclosed electroformed channels extending through said sheet member between said opposing major surfaces for the circulation of fluids through each of said channels [said channels having a predetermined cross sectional shape] *wherein each adjacent pair of said channels are joined at an undulating boundary extending through said sheet member.*

[2. The article of claim 1, wherein each adjacent pair of said channels are joined at an undulating boundary extending through said sheet member.]

3. The article of claim 1, wherein said channels are parallel and uniformly spaced with respect to each other within said sheet member.

[4. The article of claim 1, wherein one of said major surfaces of said sheet member includes a plurality of projections, each projection containing one of said channels.]

[5. The article of claim 4, wherein said projections each include at least one side inclined relative to said major surface containing said projections at an angle sufficient to form a taper such that said projection may mesh with at least one corresponding projection when brought into contact with said corresponding projection amd adhere thereto at least partially because of the frictional characteristics of said contacting sides.]

6. The article of claim 1, wherein said sheet member is constructed of an electroformable material selected from the group consisting of nickel, copper, and alloys thereof.

7. The article of claim 1, wherein at least one pair of said channels intersect within said sheet member.

8. A method for constructing a sheet member having a plurality of channels, said method comprising the steps of:

(a) providing a mandrel having a base portion and a plurality of elongated ridge portions projecting from the base portion and having elongated edges spaced above the base portion, the ridge portions defining elongated grooves between the ridge portions, and the ridge portions having conductive surfaces; [and]

(b) electrodepositing a conductive material on the conductive surfaces with the conductive material being deposited on the edges of the ridge portions at a faster rate than on the surfaces defining inner surfaces of the grooves until the conductive material bridges across between the ridge portions to envelope central portions of the grooves and form the sheet member having a base layer and a plurality of elongated projections extending from the sheet member base layer into each of the grooves, with each of the projections containing an elongated enclosed channel ;

*(c) separating the mandrel from the sheet member; and*

*(d) electrodepositing a conductive material on the conductive surfaces of the projections with the conductive material being deposited on the edges of the projections at a faster rate than on the surfaces defining inner surfaces of the grooves until the conductive material bridges across between the projections to envelope central portions of the grooves and form additional elongated enclosed channels in the sheet member.*

[9. The method of claim 8, further comprising the step of: (c) separating the mandrel from the sheet member].

[10. The method of claim 9, wherein the sheet member projections have elongated edges spaced above the base layer, the projections defining elongated grooves between the projections, and the method further comprises the step of:

(d) electrodepositing a conductive material on the conductive surfaces of the projections with the conductive material being deposited on the edges of the projections at a faster rate than on the surfaces defining inner surfaces of the grooves until the conductive material bridges across between the projections to envelope central portions of the grooves and form additional elongated enclosed channels in the sheet member.]

11. The method of claim 8, further including the step of:

passivating the surface of said elongated ridge portions of said mandrel prior to step (b).

12. The method of claim [10,] *8* further comprising the step of:

activating said first major surface of said first sheet portion prior to step (d) in claim [10] *8*.

13. An article produced in accordance with the method of claim 8.

14. An article produced in accordance with the method of claim [10] *8*.

* * * * *

UNITED STATES PATENT AND TRADEMARK OFFICE

CERTIFICATE OF CORRECTION

PATENT NO. : Re. 34,651
DATED : Jun. 28, 1994
INVENTOR(S) : Hoopman et al.

It is certified that error appears in the above-indentified patent and that said Letters Patent is hereby corrected as shown below:

Col. 3, line 12, "16 inclined" should be --18 inclined--.

Col. 3, line 21, "of use" should be --for use--.

Col. 3, line 49, "remoal" should be --removal--.

Col. 4, line 5, "about" should be --around--.

Col. 5, line 52, "as plurality" should be --a plurality--.

Col. 6, line 15, "of of" should be --or of--.

Col. 6, line 59, "alone" should be --along--.

Col. 6, line 59, "water" should be --wafer--.

Signed and Sealed this

Thirtieth Day of January, 1996

*Attest:*

Bruce Lehman

BRUCE LEHMAN

*Attesting Officer*

*Commissioner of Patents and Trademarks*